(No Model.)
G. MATTHEWS.
APPARATUS FOR CHARGING RECEPTACLES WITH AERATED BEVERAGES.
No. 422,959. Patented Mar. 11, 1890.
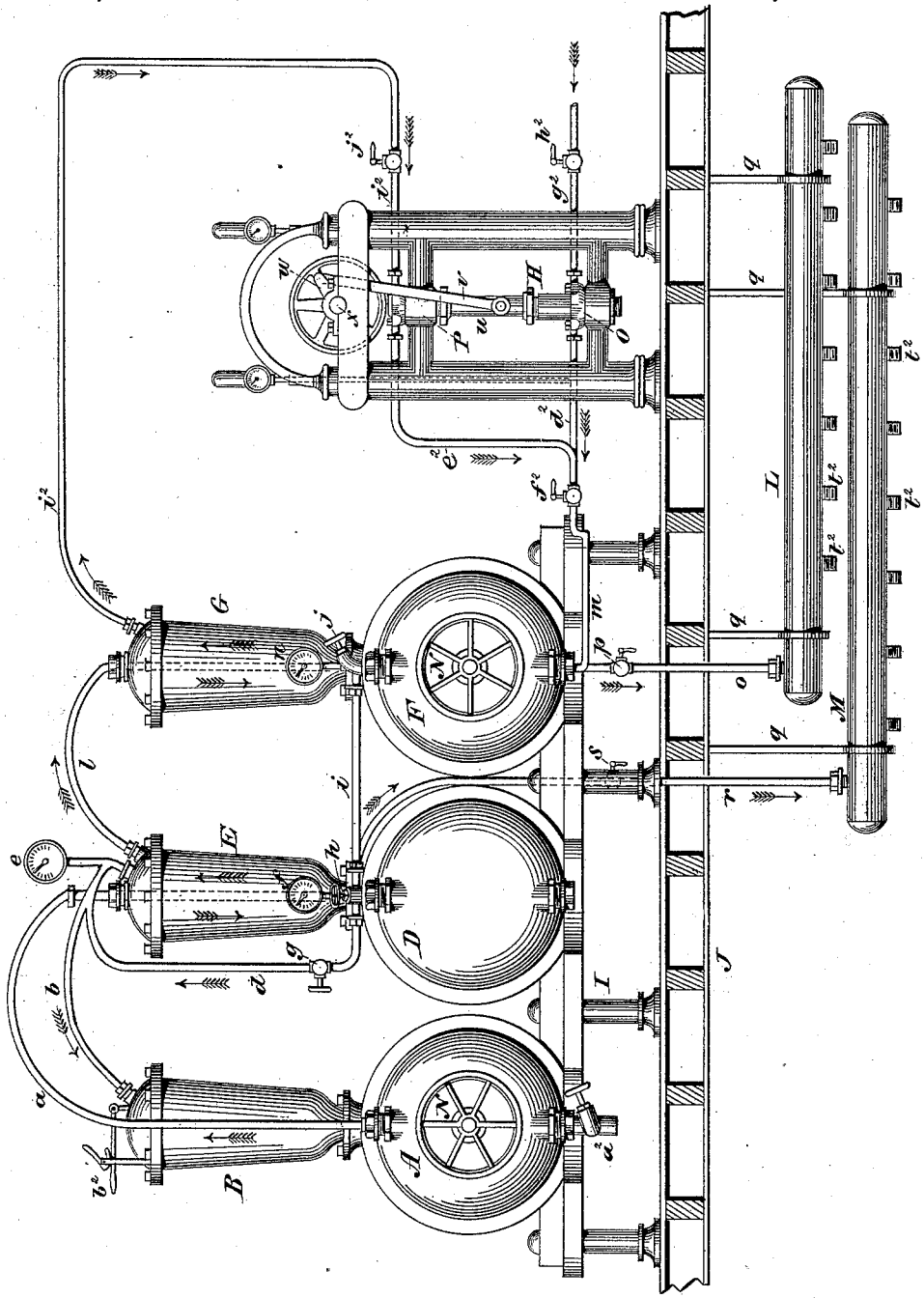
WITNESSES:
Gustave Dieterich
T. F. Bourne
INVENTOR
George Matthews
BY Briesen, Steele & Knauth
ATTORNEYS.

UNITED STATES PATENT OFFICE.

GEORGE MATTHEWS, OF NEW YORK, N. Y., ASSIGNOR TO THE FIRM OF JOHN MATTHEWS, OF SAME PLACE.

APPARATUS FOR CHARGING RECEPTACLES WITH AERATED BEVERAGES.

SPECIFICATION forming part of Letters Patent No. 422,959, dated March 11, 1890.

Application filed June 12, 1889. Serial No. 313,966. (No model.)

*To all whom it may concern:*

Be it known that I, GEORGE MATTHEWS, a resident of the city, county, and State of New York, have invented an Improved Apparatus for Charging Receptacles with Aerated Beverages, of which the following is a specification.

The object of my invention is to charge vessels or fountains with carbonated or aerated beverages by taking gas directly from the generator and passing it through a pump and mingling it with water that is also forced by a pump, and then passing said mingled gas and water to the receptacle or vessel to be charged, as more fully hereinafter set forth.

Reference is to be had to the accompanying drawing, forming part of this specification, which represents a side elevation of an apparatus to be used in carrying out my improved process.

In the accompanying drawing, the letter A represents a generator or cylinder, in which the gas is produced in the usual manner. The cylinder A is provided with a suitable discharge-valve $a^2$.

B is the acid-chamber of the generator A.

$b^2$ is a valve-lever of the acid-cylinder B.

D represents a cylinder in which the gas is stored under pressure. The cylinder D carries the purifying-chamber E, in which materials are stored for purifying the gas which passes through it. The generator or cylinder A is connected by a pipe $a$ with the lower part of the purifying-cylinder E, as shown. The acid-chamber B and the purifying-chamber E are connected by a pipe $b$. The cylinder D is connected with the cylinder E by a pipe $d$, that carries gas from D to E. On the cylinder E is or may be a pressure-gage $e$, and on the cylinder D a similar gage $f$, as shown. The pipe $d$ is provided with a valve $g$ to regulate the passage of gas from D to E.

F is a cylinder, in which water is stored under pressure of gas. The cylinders D and F are connected together by a pipe $i$, which permits passage of gas from F to D. The cylinder F has a valve $j$ to regulate the passage of gas from said cylinder.

Upon the cylinder F is a purifying-chamber G, that is connected by a pipe $l$ with the purifying-chamber E, so that gas may pass from E to G. The cylinder F connects by a pipe $m\ d^2$ with a pump O, whereby water is forced into the cylinder F, and by a pipe $m\ e^2$ with another pump P, for forcing gas into the cylinder F.

$n$ is a pressure-gage on the cylinder F to indicate the pressure within the cylinder.

The cylinders A D F and their connecting parts are supported upon a suitable framework I, that is placed upon the floor J, or in any other suitable place.

L represents an auxiliary cylinder for storing the charged water, which cylinder L, if used, is connected with the cylinder F by a pipe $o$, that is provided with a suitable valve $p$. The cylinder L is preferably supported beneath the floor J by suitable hangers $q$, as shown.

M is an auxiliary cylinder for storing gas under pressure, which cylinder, if used, is connected with the cylinder D by a pipe $r$, that is provided with a suitable valve $s$. The cylinder M is preferably supported beneath the floor J by hangers $q$, similarly to the cylinder L.

N represents hand-wheels on each of the cylinders A F, by which the agitator in the cylinders may be actuated.

The pump may be a double-acting gas and water pump, and is in that case constructed substantially as follows: O represents a water or liquid cylinder, and P represents a gas-cylinder in the pump H. The cylinders O and P are in line with each other, as shown. $u$ is a single plunger-rod that enters the two cylinders O P, so that they will both act to force gas and water simultaneously. The rod $u$ connects by a pitman $v$ with the crank $w$ on a shaft $x$, hung in suitable bearings in the frame of the pump. The shaft $x$ may be driven in any suitable manner for reciprocating the plunger-rod $u$. The water-cylinder O connects by a pipe $d^2$ with the pipe $m$ for passing water to the cylinder F, and the gas-cylinder P connects by a pipe $e^2$, also with the pipe $m$ or directly with the cylinder F, so that gas and water will simultaneously be passed to the cylinder F. $f^2$ is a valve for regulating the passage of water and gas through the pipe $m$. The water-cylinder O connects by a pipe $g^2$ with a suitable reservoir or water-supply source, which pipe $g^2$ is provided with a valve $h^2$ for regulating the passage of water. The gas-cylinder P connects by a pipe $i^2$ with the purifying-chamber G. $j^2$ is a valve in the pipe $i^2$ for regulating the passage of gas to the pump. I do not in this application make any claim to the construction of pump shown, but reserve the same for another application for a patent filed on the same day as this application, Serial No. 313,965; nor do I here limit myself to such a pump.

In using the above-described apparatus I proceed as follows: I place a charge of carbonate in the generator or cylinder A, along with sufficient water to saturate the carbonate. I also charge the acid-chamber B with acid and the purifiers E G with water. I next let a portion of the acid from the cylinder B run into the generator or cylinder A, whereupon the acid liberates the carbonic-acid gas from the material in the generator A. The gas thus liberated passes through the pipe $a$ into the first purifying-cylinder E, and thence through the pipe $l$ to the next purifying-cylinder G. After generating sufficient gas to show the desired amount in pounds pressure per inch on the pressure-gage $e$, I open the valves $f^2$, $j^2$, and $h^2$ and start the pumps O P, and thereby I fill the cylinder F to any desired amount with water and gas under pressure simultaneously. I next open the valve $j$ and let the gas from the cylinder F pass into the cylinder D, and when the pressure in the cylinders D and F indicate the amount per square inch desired, as shown by the pressure-gages $f\ n$, I shut the valve $j$ and continue to charge the cylinder F, meanwhile agitating the contents until the pressure in the cylinder F exceeds the pressure in the cylinder D. I then connect the portable fountains or vessels to be filled to the nipples $t^2$ of the auxiliary cylinders L and M in the usual way or directly to the pipes $o\ r$ and open the valve $s$ in the pipe $r$, and let the gas from cylinder D flow through said pipe into the fountain or fountains connected therewith, and when the pressure equalizes in the portable fountains and the cylinder D, I open the valve $p$ in the pipe $o$ and let the charged fluid, which is under greater pressure in F than in D, run through the pipe $o$ (and auxiliary cylinder L) into the portable fountains, whereby said fountains are filled, the surplus gas being expelled by the entering water. By means of the pump I can keep up the supply of charged fluid in the cylinders D and F, and by letting down additional acid from the cylinder B, I keep up the supply of gas for the pump. By this means I may continue the operation of generating gas, and by occasionally opening the valve $g$ and letting off any surplus gas that may be in the cylinder D and passing it through the pipe $d$, said gas, properly purified, will again pass through the pump P and into the cylinder F. It will be observed that I carry a pressure on cylinders D and F in excess to that carried in the generator A.

The operation above described differs from all previous modes of filling fountains, in that I work the generator preferably at a pressure of between fifty and one hundred pounds per square inch in direct combination with gas and water pumps and fill the storage-cylinders D F direct from the generator by the aid of a pump without first expanding the gas into a gasometer and at the same time supplying any desired quantity of water to the vessel F from any reservoir handy.

Having now described my invention, what I claim is—

The combination of the gas-pump P and water-pump O, with a system of pipes leading from the gas-pump to the generator A, with said generator, with the water-supply pipe $g^2$, gas-discharge pipe $e^2$, water-discharge pipe $d^2$, gas and water receiving vessel F, pipe $i$, and gas-receiving vessel D, substantially as herein shown and described.

GEORGE MATTHEWS.

Witnesses:
J. H. FEGANDIE,
J. H. BUSSING.